United States Patent
Arends et al.

[11] Patent Number: 5,940,953
[45] Date of Patent: Aug. 24, 1999

[54] CART AND METHOD FOR CHANGING TOOLING IN A THERMOFORMER MACHINE

[75] Inventors: Albert W. Arends; Andrew P. Richard, both of Gladwin, Mich.

[73] Assignee: Brown Machine LLC., Beaverton, Mich.

[21] Appl. No.: 08/922,959

[22] Filed: Sep. 3, 1997

[51] Int. Cl.⁶ .................................................. B23P 11/00
[52] U.S. Cl. ...................... 29/434; 280/47.35; 280/43.2; 280/35
[58] Field of Search ............................... 280/47.35, 79.2, 280/79.3, 43.17, 43.2, 35; 29/434

[56] References Cited

U.S. PATENT DOCUMENTS 968,201   8/1910   Shannon .
1,225,644 5/1917   Kandlbinder .
1,359,032 11/1920  Cole .

*Primary Examiner*—P. W. Echols
*Assistant Examiner*—John Hong
*Attorney, Agent, or Firm*—John R. Benefiel

[57] ABSTRACT

A wheeled tooling cart for a thermoformer machine enabling quick and easy removal and installation of upper and lower tooling plates from their respective platens. The tooling plates are held on upper framework on the cart, which are removed one at a time with the cart in position adjacent the machine with one and the opposite end successively. The tooling plates are held in position on the cart for reinstallation when the cart is appropriately repositioned with respect to the thermoformer machine. An elevator mechanism allows an upper framework having attachment brackets and rails for holding the tooling plates to be raised and lowered on a wheeled lower framework to move the attachment brackets and rails into proper position for attachment and removal of the tooling plates.

13 Claims, 3 Drawing Sheets

CART AND METHOD FOR CHANGING TOOLING IN A THERMOFORMER MACHINE

BACKGROUND OF THE INVENTION

The present invention concerns thermoforming apparatus, particularly apparatus including tooling which trims the thermoformed items from the selvage while they are still in the mold. This process is used for manufacturing such products as plastic cups, with several dozen cups formed from a single sheet which has been first preheated in an oven. After trimming, the cups are ejected into a stacker-counter.

The molds and trim punch and dies tooling are disposed on upper and lower tooling plates mounted to upper and lower press platens.

In one version of this machine, the lower platen is pivotally mounted to be able to be tilted out to position the lower tooling plate to be tilted outwardly from the machine, enabling the formed items to be ejected into the stacker.

The tooling plates are quite massive and much labor and time are required to change over tooling to produce a different item. This is particularly true of the lower tooling plate in machines with pirated lower platens since it is difficult to orient the plate in the tilted position necessary to be mounted to the lower platen when using an overhead crane.

The upper tooling plate has been removed by bolting auxiliary rails onto support rails in the machine and rolling the upper tool plate out onto these rails for lift off by a crane. This requires installation and removal of the auxiliary rails with every tooling change.

SUMMARY OF THE INVENTION

The above object is achieved by providing a wheeled cart especially configured to enable the upper and lower tooling plates to be transferred onto the cart from the machine with only minimal handling and effort of the tooling plates in aligning the cart receiving surfaces, particularly with an outwardly tilted lower tooling plate. The cart is thereafter rolled away to a storage location. Similarly, both tooling plates are able to be reloaded into the machine from the cart with minimal time and effort.

The cart has an upper framework supported on a lower base framework with a series of elevating screw posts, a chain and sprocket manually operated mechanism allowing precision raising and lowering of the upper framework by synchronous rotation of the screw posts, even with both tooling plates loaded onto the upper framework.

The upper framework has pairs of spaced apart upper and lower arms projecting horizontally from one end of the cart for receiving the lower tooling plate. The ends of the pairs of arms each have a bracket piece attached thereto angled to be fit against and beneath the outwardly tilted tooling plate in its position on the thermoforming machine. A bolt is passed through each bracket piece and into a respective threaded hole into the tooling plate to secure the same to the pairs of arms.

A pair of parallel rail members at the top of the upper framework form tracks for receiving the roller mounted upper tooling plate advanced thereonto from the other end of the cart. A tapered plug at the receiving end of each rail is positioned to be received in a locating hole beneath the support rails in the machine when the upper framework is elevated, to insure proper alignment of the cart and level of the upper framework, and to hold the cart against the machine as the upper tooling plate is rolled onto the cart rails.

A pair of pivoted arms are located at the other end of the rails each having a recess capturing a tooling plate roller as the plate moves to the other end to prevent the upper tooling plate from inadvertently rolling off the rails.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
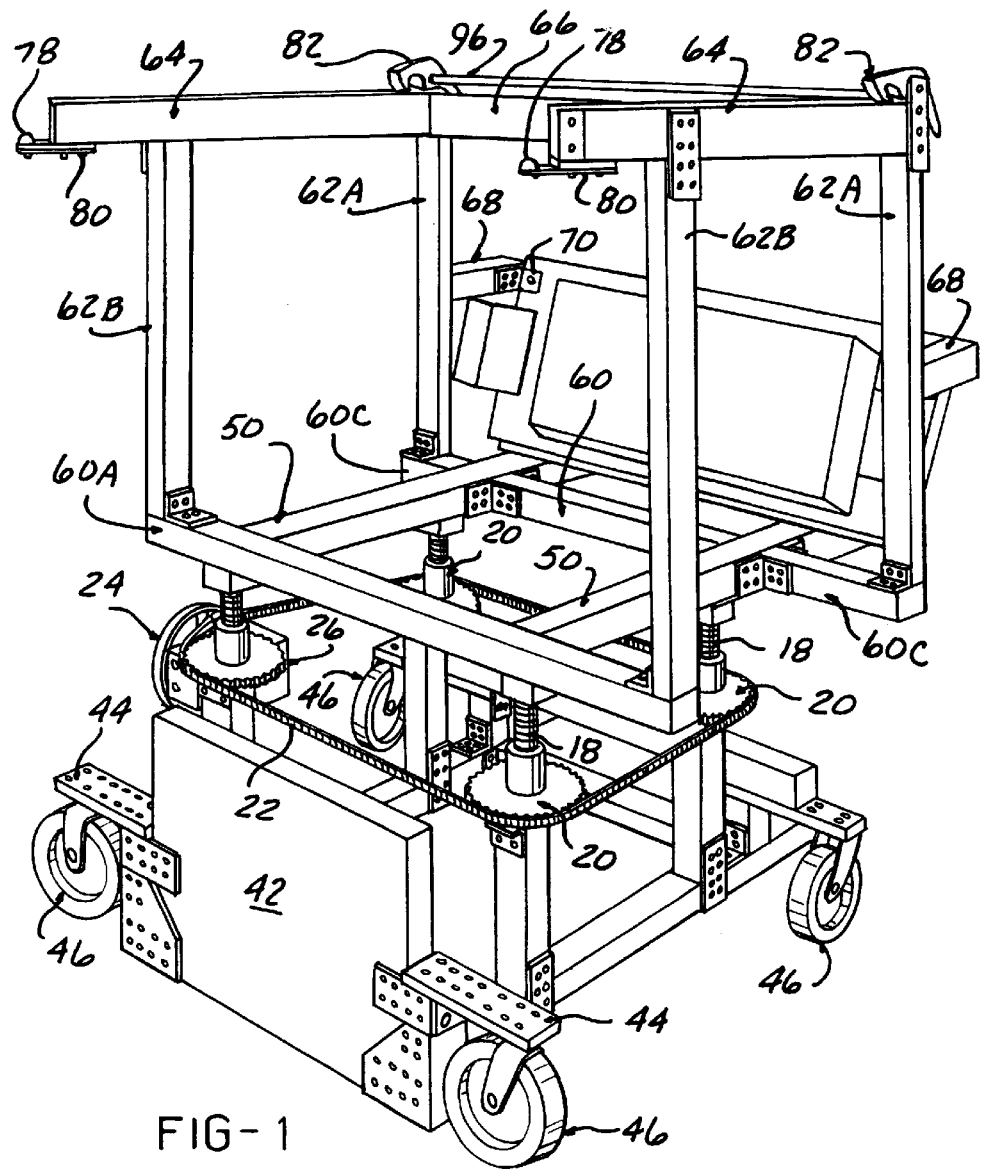
FIG. 1 is a perspective view of the tooling cart according to the present invention with the lower tooling plate loaded thereon.

FIG. 1 shows the tooling cart 10 according to the present invention having the lower tooling plate 12 loaded on one end.

The cart 10 is constructed of a series of extruded aluminum beams connected together with various angles and plates to form an upper carrier framework 14, which is adapted to support the tooling plates, and a lower base framework 16, supported on swiveling caster wheels 46, 56.

The upper carrier framework 14 is supported on the base framework 16 by four threaded posts 18, each received in a respective one of four sprocket-nuts 20 rotated by a chain loop 22 circulating around a sprocket 21 of each sprocket-nut 20, and driven by a pinion rotated by a hand wheel 24 and right angle drive 26.

Figure 4:
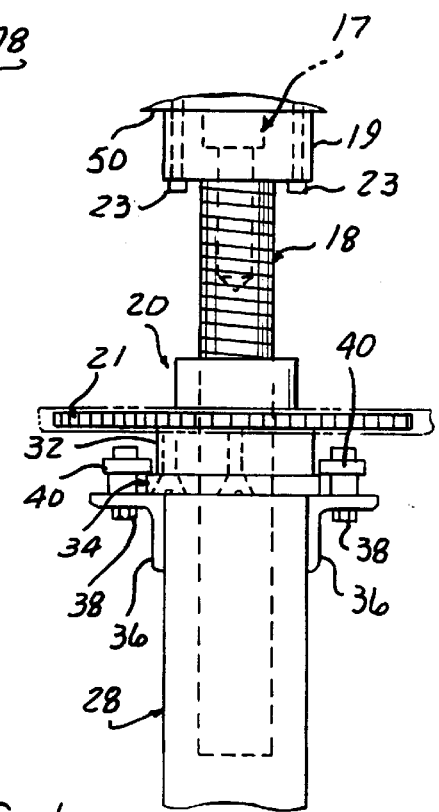
FIG. 4 is an enlarged view of one of the elevating screw post and associated sprocket-nut.
Figure 5:
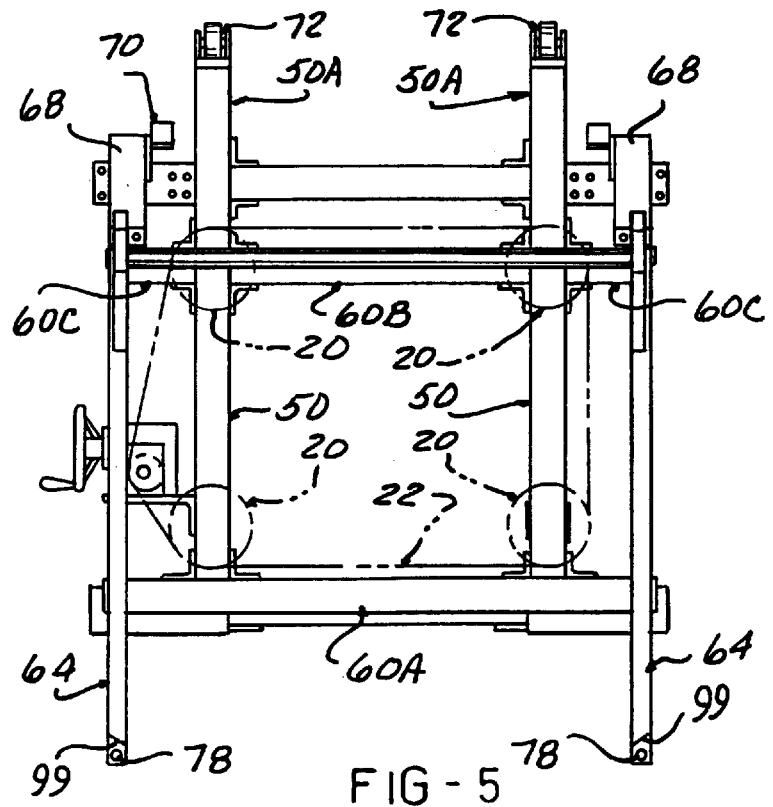
FIG. 5 is a plan view of the tooling cart shown in FIGS. 1–3.
Figure 6:
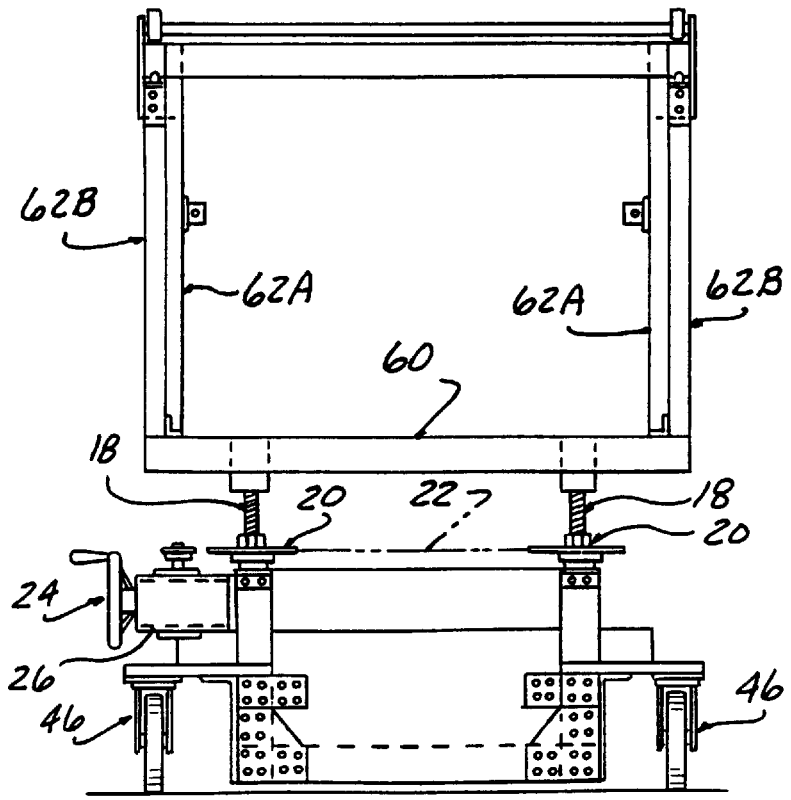
FIG. 6 is an end view of the tooling cart.

As seen in FIG. 4, the threaded posts 18 are slidably received in one of four upright extrusion members 28 connected to a pair of bottom beams 30. Rotation of the sprocket-nut 20 in unison by the chain 22 causes the threaded posts 18 to elevate or lower the same amount simultaneously. The upper end of each post 18 is fixed to a mounting block 19, with a bolt 17, the blocks 19 fixed with screws 23 to the underside of a respective one of a pair of lower beams 50 of the upper framework 14, so that the upper framework 14 is raised or lowered correspondingly. Each sprocket-nut 20 is rotatably mounted to the upper end of the associated upright 28 by a plate 32 having a brass bearing disc 34 secured on angle brackets 36 by bolts 38 and keepers 40 (FIG. 4).

The base framework 16 includes the main support beams 20 each having one end connected to a thick steel plate 42 acting as a counterweight for the lower tooling plate 12 held on the other end of the cart 10.

A pair of cantilevered plates 44 are attached to the sides of the steel plate 42 and each have a swiveling caster 46 mounted on the underside of the overhanging portion.

The main support beams 30 extend forwardly of the upright 28 at the other end, each having a short upright 48 connected by a cross beam 52 which overhangs each upright 48. Cantilevered plates 54 mount a second pair of swiveling caster wheels 56.

The main support beams 30 extend further (FIG. 3) to small stabilizer rollers 58 intended to resist tipping due to the forward overhung position of the lower tooling plate 12.

The upper framework 14 includes the pair of parallel lower beams 50 previously mentioned, and cross beams 60A, 60B forming a generally rectangular frame lying in a horizontal plane.

A pair of vertical posts 62 are each connected to respective ends of cross beam extensions 60C, and a pair of posts 62B are fixed with their long sides parallel, attached to the ends of cross beam 60A.

A pair of upper tooling plate support rails 64 are attached to the upper ends of the posts 62A, 62B and an upper cross beam 66 is connected to the rail ends attached to posts 62A.

A pair of extension bars 68 are fixed to posts 62A at an intermediate level, while lower beam 50 each have a portion 50A extending forwardly of the cross beam 60B below the extension bars 68.

The extension bars 68 each have an attachment bracket 70 affixed at its outer end, while beams 50 each have an attachment rest 72 affixed to its extended end. The bracket 70 and rest have abutment surfaces inclined in correspondence to the tilt of the lower tooling plate 12.

Figure 2:
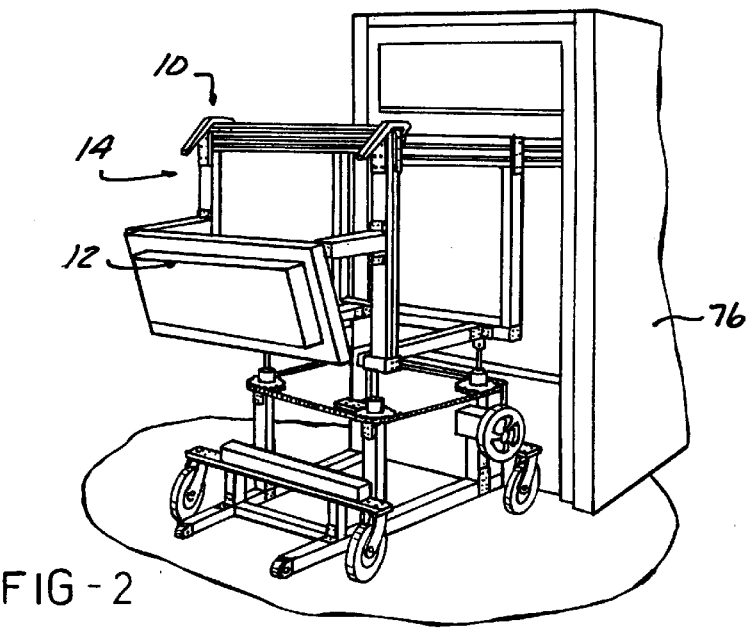
FIG. 2 is a reverse perspective view of the tooling cart shown in FIG. 1 in position before a thermoformer machine to receive the upper tooling plate.
Figure 3:
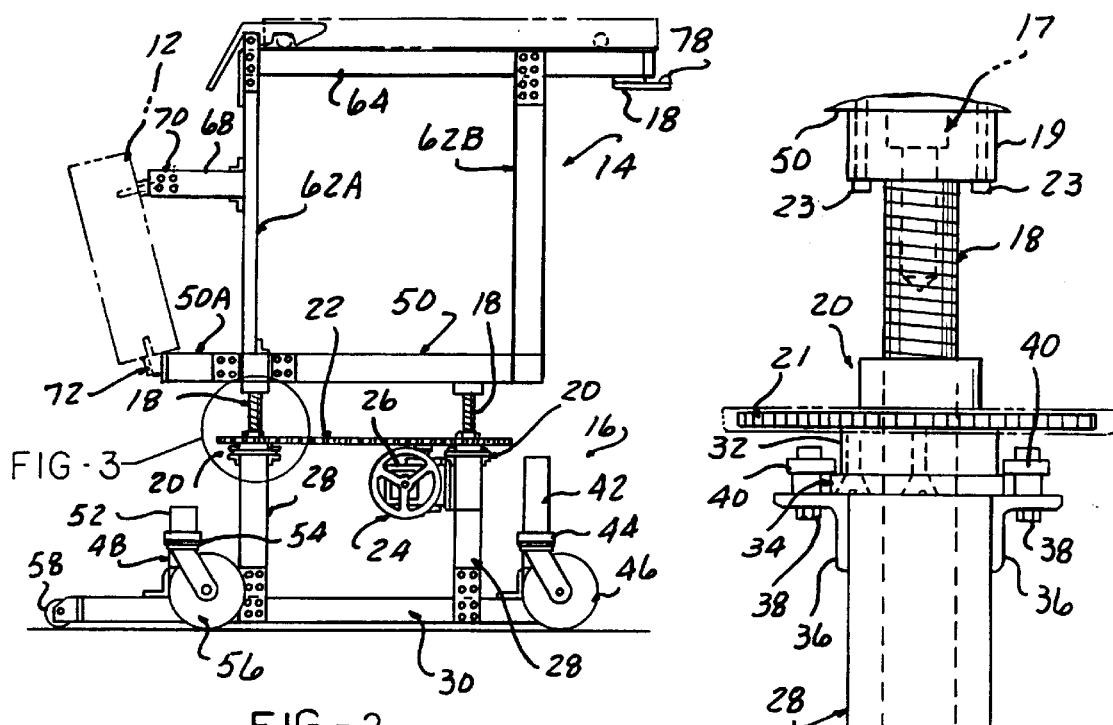
FIG. 3 is a side elevational view of the tooling cart, showing the tooling plates loaded thereon in phantom outline.

The tilted lower tooling plate 12 secured on the extension bars 68 and beams 50 when the cart is moved to the thermoforming machine 76 (FIG. 2 showing the cart turned around preparatory to removal of the upper tooling plate). This is accomplished by bolts passed through brackets 70 and rests 72 into threaded holes in the tooling plate 12 (FIG. 3).

The support rails 64 extend past posts 62B at the other end of the cart 10, and each have rail 64 has a tapered locator plug 78 positioned extending upwardly with a plate 80 fixed spaced below the underside of the rail end.

Figures 7, 8:
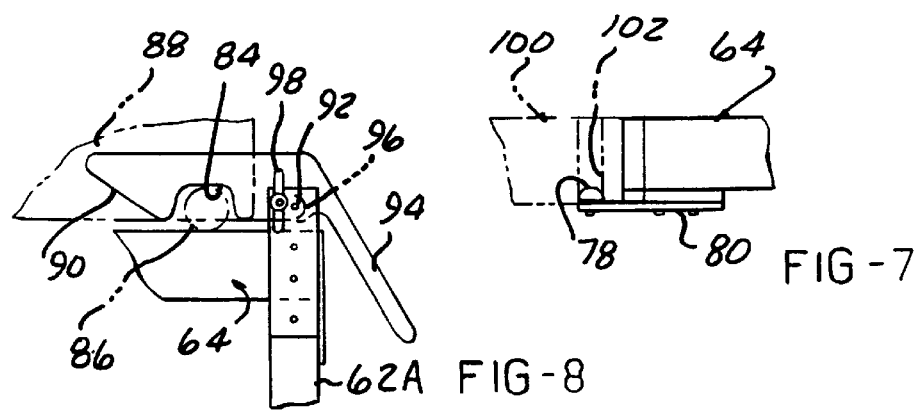
FIG. 7 is an enlarged fragmentary view of the end of the rails aligned with the machine upper tooling plate rails.
FIG. 8 is an enlarged fragmentary side view of one of the upper tooling plate latching arms, with a locking pin installed.

A pivoted catch dog 82 mounted is at the opposite end of each rail 64 has a recess 84 (FIG. 8) configured to capture a roller 86 of the upper tooling plate 88.

Each of the catch dogs 82 each have an inclined cam surface 90 which causes the rollers 82 to cam up the engaged dog 82 against the downward bias created by the greater weight of the dog forward of the pivot 92. Release levers 94 allow ready release of the rollers 86.

A cross tube 96 insures both dogs 82 move together. A releasable locking pin 98 can be used to secure the locking dogs 82 in their down position to prevent inadvertent release of the upper tooling plate 88.

The ends of the support rails 64 are angled at 99 to mate with the usually angled ends of the support rails 100 of the machine 76.

The lower tooling plate 12 is first removed by rolling the cart 10 to the machine 76 with the end having the brackets 70 and 72 towards the machine, the upper framework 14 raised or lowered as necessary.

The cart 10 is turned around to bring the opposite end towards the machine 76, raising framework 14 by operation of the handwheel 24 to advance the locator plug 78 into a socket or hole 102 in the machine rails 100.

The plugs 78 locate and hold the rails 100 and 64 in end-to-end abutment. The angled ends 99 minimize the resistance to rolling advance of the plate 88 onto the rails 64 if some slight misalignment exists.

The cart 10 is then rolled away to a storage location. Reinstallation of the tooling plates is carried out in reverse order.

The elevating mechanism offers some ability to align the tooling plates when the tooling plates are being removed or installed.

We claim:

1. A tooling cart for installation and removal of upper and lower tooling plates of a thermoformer machine said upper tooling plate mounted on rollers, and said lower tooling plate mounted to a lower platen pivotable to tilt the lower tooling plate outwardly from said machine, said cart comprising:

a lower base framework mounted on wheels to be movable along a floor on which said thermoformer machine rests to a position adjacent said thermoformer machine;

an upper framework supported on said lower base framework;

an elevator mechanism carried by said lower framework and providing support for said upper framework, selectively allowing raising and lowering of said upper framework on said base framework;

attachment points on said upper framework for securing said lower tooling plate thereto at one end of said upper framework; and, said upper framework including a pair of parallel rails extending along the length thereof at an upper region of said upper framework, adapted to receive said upper tooling plate on rollers engaging said parallel rails.

2. The tooling cart according to claim 1 wherein said upper framework includes vertically spaced pairs of arms projecting from one end of said cart, said attachment points located at the ends of said arms.

3. The tooling cart according to claim 1 wherein said attachment points include brackets having abutment surfaces inclined to be parallel to the tilt of said lower plate.

4. The tooling cart according to claim 1 wherein said elevating mechanism comprises a series of threaded posts holding said upper framework, a nut element on each threaded post held against axial movement, a chain sprocket fixed to each nut element, a chain circulating around said sprockets, and means for driving said chain to cause simultaneous rotation of each sprocket and nut simultaneously causing said threaded posts to be simultaneously raised or lowered to the same extent.

5. The tooling cart according to claim 1 further including latching means on said rails for latching onto said upper tooling plate to hold the same in position thereon.

6. The tooling cart according to claim 5 wherein said latching means comprises a pair of latching arms, each pivoted at one end of a respective rail, each having a cutout recess on the underside configured to capture a tooling plate roller as said roller passes beneath said lifts on said arm and moves into registry with said recess.

7. The tooling cart according to claim 6 wherein said latching arms are connected to pivot together.

8. The tooling cart according to claim 2 further including a counterweight fixed on said base framework at an end opposite said one end.

9. The tooling cart according to claim 8 further including a pair of stabilizer rollers each on an extension member extending below and beyond said lower tooling plate attached to said pairs of projecting arms.

10. The tooling cart according to claim 1 further including an upwardly projecting locator on one end of each rail adapted to mate with a feature on a machine rail when said upper framework is elevated to thereby locate said cart said rails in alignment with said machine rails.

11. A method of removing and thereafter reinstalling a lower tooling plate of a thermoformer machine having a pivoted lower platen movable to tilt said lower tooling plate outwardly from said thermoformer machine, comprising the steps of:

positioning one end of a movable cart with respect to a lower platen of said machine so that angled attachment brackets of said cart are in engagement with said outwardly tilted lower tooling plate, and thereafter fixing said brackets to said lower tooling plate;

moving said cart away from said machine with said tooling plate attached;

moving said cart to reposition said cart with respect to said machine lower plate with said lower tooling plate tilted in correspondence with said pivoted lower platen, reattaching said lower tooling plate to said lower platen, and releasing said lower tooling plate from said cart.

12. The method according to claim 11 further including steps for removing and installing a roller mounted upper tooling plate from machine rails on an upper platen of said machine, comprising the steps of:

positioning a pair of rails on said cart in alignment with said machine rails;

releasing said upper tooling plate from said upper platen;

rolling said upper tooling plate onto said cart rails and securing said upper tooling plate on said cart rails;

moving said cart away from said thermoformer machine;

repositioning said cart with said cart rails in alignment with said machine rails, releasing said upper tooling plate from said cart rails, rolling said tooling plate onto said machine rails and reattaching said upper tooling plate to said upper platen.

13. The method according to claim 12 further including the steps of raising or lowering an upper part of said cart relative a lower wheeled part as a part of said steps of positioning said attachment brackets and cart rails.

\* \* \* \* \*